(12) United States Patent
Ala-Savikota

(10) Patent No.: US 7,308,806 B2
(45) Date of Patent: Dec. 18, 2007

(54) AIR-EXHAUSTING LEHR FOR LAMINATED GLASS SHEETS

(75) Inventor: Jari Ala-Savikota, Tampere (FI)

(73) Assignee: Tamglass Ltd. Oy, Tampere (FI)

( * ) Notice: Subject to any disclaimer, the term of this patent is extended or adjusted under 35 U.S.C. 154(b) by 261 days.

(21) Appl. No.: 11/061,552

(22) Filed: Feb. 18, 2005

(65) Prior Publication Data

US 2005/0183458 A1  Aug. 25, 2005

(30) Foreign Application Priority Data

Feb. 20, 2004  (FI) .................................. 20045046

(51) Int. Cl.
  *C03B 27/00*  (2006.01)
  *C03B 25/00*  (2006.01)

(52) U.S. Cl. .......................................... 65/273; 65/349

(58) Field of Classification Search .................. 65/111, 65/114, 119, 273, 349, 161, 194, 268, 165, 65/167, 269, 274, 375, 157, 117, 118; 432/11; 55/498

See application file for complete search history.

(56) References Cited

U.S. PATENT DOCUMENTS

| | | | | |
|---|---|---|---|---|
| 1,642,790 A | * | 9/1927 | Shackelford ................. | 65/119 |
| 3,223,498 A | * | 12/1965 | Davidson, Jr. ............... | 65/25.2 |
| 3,574,586 A | | 4/1971 | Johnson | |
| 3,914,119 A | * | 10/1975 | Jack et al. ................... | 65/104 |
| 3,923,488 A | * | 12/1975 | Pytel et al. .................. | 65/114 |
| 3,955,955 A | * | 5/1976 | Melling ....................... | 65/104 |
| 3,963,469 A | * | 6/1976 | Pierre .......................... | 65/194 |
| 4,297,121 A | * | 10/1981 | Rhonehouse ................ | 65/348 |
| 4,300,937 A | * | 11/1981 | Rhonehouse ................ | 65/114 |
| 4,497,645 A | * | 2/1985 | Peltonen ..................... | 65/107 |
| 5,419,799 A | * | 5/1995 | Lind et al. .................. | 156/381 |
| 5,695,537 A | * | 12/1997 | Sykes ......................... | 65/106 |
| 5,700,306 A | * | 12/1997 | Maltby et al. ............. | 65/182.2 |
| 5,876,477 A | * | 3/1999 | Bennett et al. .............. | 65/273 |
| 6,629,838 B1 | | 10/2003 | Van Vuuren et al. | |
| 6,983,624 B2 | * | 1/2006 | Yli-Vakkuri ................ | 65/274 |

FOREIGN PATENT DOCUMENTS

DE  198 09 582 C1  8/1999
JP  58 048618 A  3/1983

* cited by examiner

*Primary Examiner*—Steven P. Griffin
*Assistant Examiner*—DeMaris R. Wilson
(74) *Attorney, Agent, or Firm*—Buchanan Ingersoll & Rooney, PC

(57) ABSTRACT

The invention relates to an air-exhausting lehr for laminated glass sheets, including a tunnel-like lehr, a conveyor, including elements for carrying laminated glass sheets in a substantially upright position through the lehr, and air circulation ducts, having fans and heating elements associated therewith for blasting heated air between the laminated glass sheets presently on the conveyor within the lehr. The lehr has its sides provided with movable walls for adjusting the lehr width to match a given glass size. This results in an enhanced passage of air between glass sheets regardless of variations in glass size.

14 Claims, 2 Drawing Sheets

AIR-EXHAUSTING LEHR FOR LAMINATED GLASS SHEETS

TECHNICAL FIELD

The present invention is directed to an air-exhausting lehr for laminated glass sheets, and in particular, to an air-exhausting lehr having an enhanced passage of air between the glass sheets regardless of variations in glass size.

BACKGROUND OF THE INVENTION

The present invention relates to an air-exhausting lehr for laminated glass sheets, comprising a tunnel-like lehr, having a longitudinal direction and a lateral direction; a conveyor for carrying laminated glass sheets continuously through the lehr; retainer elements present in the conveyor for holding the glass sheets in a substantially upright position and in a lateral direction of the lehr, i.e. crosswise relative to the conveying direction; air circulation ducts, having fans and heating elements associated therewith for blasting heated air between the laminated glass sheets presently on the conveyor within the lehr; slots associated with the air circulation ducts in the lehr's floor and ceiling for the circulation of air; and curtains or valves at the outer ends of the lehr tunnel for covering tunnel mouths.

This type of air-exhausting lehr is known from U.S. Pat. No. 5,419,799 assigned to Tamglass Engineering Oy, the entire contents of which is hereby incorporated by reference.

The specification of DE-198 09 582 Cl discloses a batch-type heat treatment space for performing a "Heat Soak" treatment on glass panels. Because of varying batch sizes, the heat treatment space is provided with movable walls for an enhanced circulation of hot air through between individual glass sheets

SUMMARY OF THE INVENTION

It is an object of the present invention to further improve upon this prior known air-exhausting lehr by providing an enhanced passage of air between glass sheets regardless of variations in glass size.

This and other objects are achieved by providing an air-exhausting lehr for laminated glass sheets, comprising a tunnel-like lehr having a longitudinal direction and a lateral direction; a conveyor for carrying laminated glass sheets continuously through the lehr; retainer elements present in the conveyor for holding glass sheets in a substantially upright position and in the lateral direction of the lehr; air circulation ducts, having fans and heating elements associated therewith for blasting heated air between the laminated glass sheets disposed on the conveyor within the lehr; slots associated with the air circulation ducts in a floor and a ceiling of the lehr for the circulation of air; and means for covering at least a portion of the tunnel mouth at each outer end of the lehr tunnel, wherein the sides of the lehr are provided with movable walls for adjusting the lehr width to match a given glass size.

BRIEF DESCRIPTION OF THE DRAWINGS

One exemplary embodiment of the invention will now be described in more detail with reference to the accompanying drawings, in which.

DETAILED DESCRIPTION OF THE PREFERRED EMBODIMENT

Regarding the functions and structural details of the air-exhausting lehr, which do not fall within the scope of this invention, reference is made to the above-noted U.S. Pat. No. 5,419,799. Further, with regard to DE-198 09 582 Cl, the present invention differs from the teaching therein in terms of the orientation, continuous operation, and heat treatment application of glasses.

Figure 1:
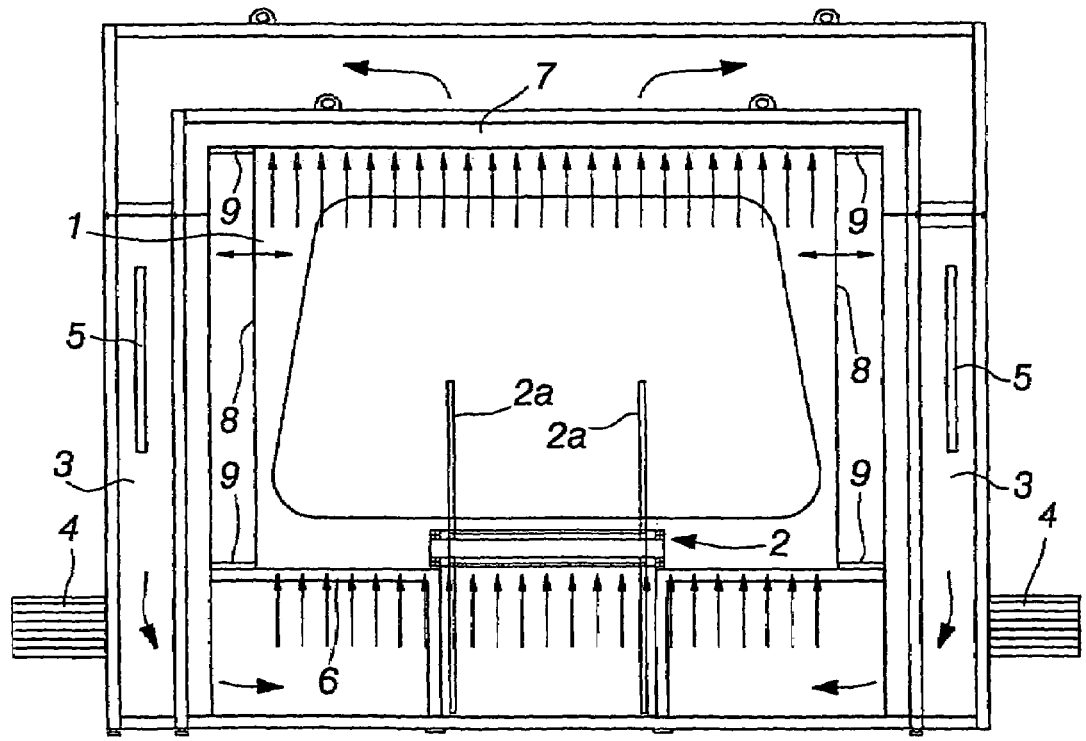
FIG. 1 shows an air-exhausting lehr according to a preferred embodiment of the present invention in cross-section with a large glass size.
Figure 2:
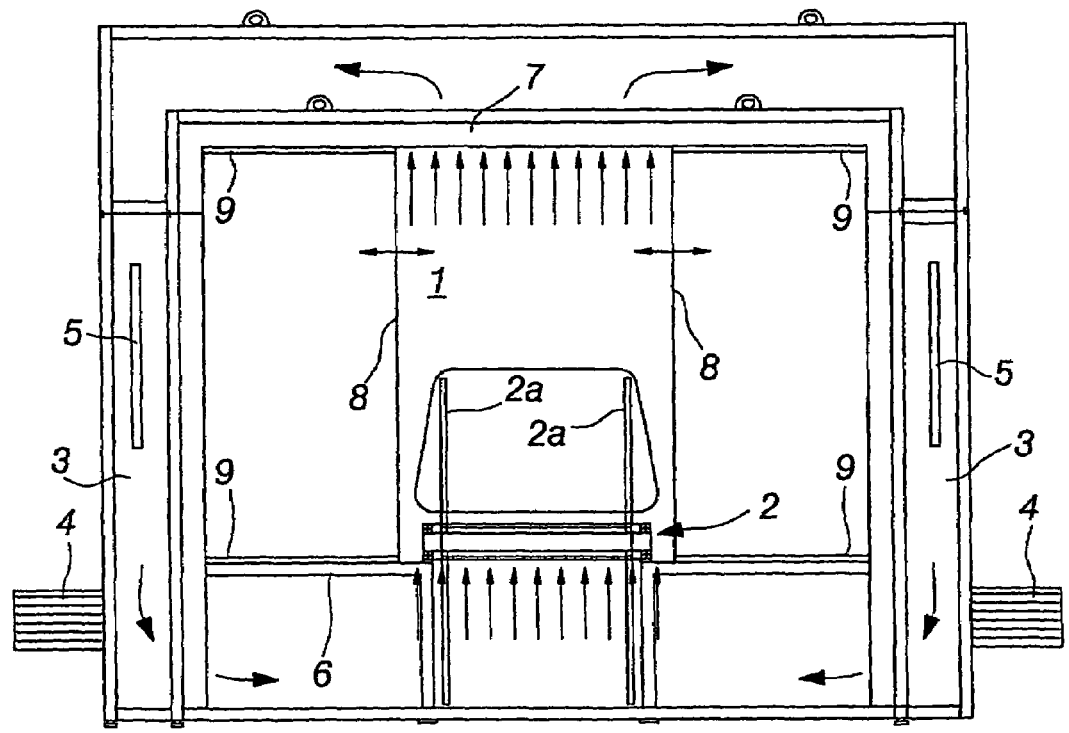
FIG. 2 shows the same lehr in cross-section with a small glass size.

Referring to FIGS. 1 and 2, the illustrated air-exhausting lehr comprises a tunnel-like furnace or lehr 1, including a conveyor 2 whose retainer arms 2a support pairs of glass sheets in an upright position. The glass sheets are disposed in a lateral direction of the lehr, i.e. crosswise to the conveying direction. The pairs of glass sheets presently disposed on the conveyor 2 proceed slowly through the lehr 1. Thus, the lehr is continuous in operation. The lehr 1 is encircled by air circulation ducts 3, having fans 4 and heating elements 5 associated therewith for blasting heated air therethrough, and between the pairs of glass sheets presently on the conveyor within the lehr.

One of the novel features in the preferred embodiment of the present invention is that the lehr is provided on both sides with movable sealing walls 8, whereby the lehr width can be adjusted to match a given glass size. This adjustment applies explicitly to the effective width of the lehr 1, overwhich the blasting of air takes place. Preferably, the walls 8 can be displaced manually or automatically.

In the preferred embodiment, the air is blown in between pairs of glass sheets vertically upwards through a floor 6 of the lehr. The lehr has its floor 6 provided with appropriate blasting slots, the suction taking place respectively by way of suction slots provided in a ceiling 7 of the lehr. The air may also have a reverse circulation direction, such that the blasting takes place from the ceiling of the lehr and the suction from its floor. It is also possible to provide a feature for reversing the circulation direction of air.

In the preferred embodiment, the walls 8 include substantially upright panels, having their top and bottom ends provided with substantially horizontal cover screens or cover lamellae 9. These screens or lamellae 9 preferably cover those of the slots in the floor 6 and in the ceiling 7 which are not presently between the walls 8. The cover screens 9 can be e.g. rewindable or in the form of overlappable lamellae. Accordion-type folding and unfolding cover screens may also be useful. It may also be possible to use cover screens 9 guided the same way as rolling doors along a curving guideway to the housing wall of a lehr.

Adjustability of the effective width of the lehr 1 provides a number of benefits, such as: a more consistent heating of glasses due to a controlled passage of air between the glasses; a suppression of sound level as only a small proportion of the tunnel mouth is covered by curtains used at the outer ends of the lehr tunnel since the remaining tunnel mouth is more effectively covered by glasses present on the conveyor 2, and it is feasible to use an up and down adjustable curtain or valve at the ends of the lehr tunnel; and a conservation of energy with less air escaping from the tunnel ends through curtains.

While the present invention has been described with respect to particular embodiments of the present invention, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the present invention, as defined in the appended claims.

What is claimed is:

1. An air-exhausting lehr for laminated glass sheets, comprising:
 a tunnel-like lehr having a longitudinal direction and a lateral direction;
 a conveyor for carrying laminated glass sheets continuously through the lehr;
 retainer elements present in the conveyor for holding glass sheets in a substantially upright position and in the lateral direction of the lehr;
 air circulation ducts, having fans and heating elements associated therewith for blasting heated air between the laminated glass sheets disposed on the conveyor within the lehr;
 slots associated with the air circulation ducts in a floor and a ceiling of the lehr for the circulation of air; and
 means for covering at least a portion of the tunnel mouth at each outer end of the lehr tunnel,
 wherein the sides of the lehr are provided with movable walls for adjusting the lehr width to match a given glass size, and
 wherein the walls include substantially upright panels, having their top and bottom ends provided with substantially horizontal cover screens.

2. An air-exhausting lehr as set forth in claim 1, wherein the cover screens are rewindable.

3. An air-exhausting lehr as set forth in claim 1, wherein the circulation direction of hot air is such that the blasting takes place from a floor of the lehr through the conveyor and the suction takes place from a ceiling of the lehr across the area defined between the movable walls.

4. An air-exhausting lehr as set forth in claim 1, wherein the circulation direction of hot air is such that the blasting takes place from a ceiling of the lehr and the suction takes place from a floor of the lehr across the area defined between the movable walls.

5. An air-exhausting lehr as set forth in claim 1, wherein said retainer elements in the conveyor are disposed for holding glass sheets in a crosswise direction relative to a conveying direction.

6. An air-exhausting lehr as set forth in claim 1, wherein said means for covering at least a portion of the tunnel mouth at each outer end of the lehr tunnel includes a curtain.

7. An air-exhausting lehr as set forth in claim 1, wherein said means for covering at least a portion of the tunnel mouth at each outer end of the lehr tunnel includes a valve.

8. An air-exhausting lehr for laminated glass sheets, comprising:
 a tunnel-like lehr having a longitudinal direction and a lateral direction;
 a conveyor for carrying laminated glass sheets continuously through the lehr;
 retainer elements present in the conveyor for holding glass sheets in a substantially upright position and in the lateral direction of the lehr;
 air circulation ducts, having fans and heating elements associated therewith for blasting heated air between the laminated glass sheets disposed on the conveyor within the lehr;
 slots associated with the air circulation ducts in a floor and a ceiling of the lehr for the circulation of air; and
 means for covering at least a portion of the tunnel mouth at each outer end of the lehr tunnel,
 wherein the sides of the lehr are provided with movable walls for adjusting the lehr width to match a given glass size, and
 wherein the walls include substantially upright panels, having their top and bottom ends provided with cover lamellae.

9. An air-exhausting lehr as set forth in claim 8, wherein the lamellae are overlappable.

10. An air-exhausting lehr as set forth in claim 8, wherein the circulation direction of hot air is such that the blasting takes place from a floor of the lehr through the conveyor and the suction takes place from a ceiling of the lehr across the area defined between the movable walls.

11. An air-exhausting lehr as set forth in claim 8, wherein the circulation direction of hot air is such that the blasting takes place from a ceiling of the lehr and the suction takes place from a floor of the lehr across the area defined between the movable walls.

12. An air-exhausting lehr as set forth in claim 8, wherein said retainer elements in the conveyor are disposed for holding glass sheets in a crosswise direction relative to a conveying direction.

13. An air-exhausting lehr as set forth in claim 8, wherein said means for covering at least a portion of the tunnel mouth at each outer end of the lehr tunnel includes a curtain.

14. An air-exhausting lehr as set forth in claim 8, wherein said means for covering at least a portion of the tunnel mouth at each outer end of the lehr tunnel includes a valve.

\* \* \* \* \*